(12) United States Patent
Banino et al.

(10) Patent No.: US 10,605,608 B2
(45) Date of Patent: Mar. 31, 2020

(54) PERFORMING NAVIGATION TASKS USING GRID CODES

(71) Applicant: DeepMind Technologies Limited, London (GB)

(72) Inventors: Andrea Banino, London (GB); Sudarshan Kumaran, London (GB); Raia Thais Hadsell, London (GB); Benigno Uria-Martinez, London (GB)

(73) Assignee: DeepMind Technologies Limited, London (GB)

(*) Notice: Subject to any disclaimer, the term of this patent is extended or adjusted under 35 U.S.C. 154(b) by 0 days.

(21) Appl. No.: 16/407,645

(22) Filed: May 9, 2019

(65) Prior Publication Data
US 2019/0346272 A1    Nov. 14, 2019

Related U.S. Application Data

(60) Provisional application No. 62/669,355, filed on May 9, 2018.

(51) Int. Cl.
| | |
|---|---|
| *G01C 21/20* | (2006.01) |
| *G06T 7/73* | (2017.01) |
| *G06N 3/04* | (2006.01) |
| *G06N 3/08* | (2006.01) |

(52) U.S. Cl.
CPC .............. *G01C 21/20* (2013.01); *G06N 3/04* (2013.01); *G06N 3/0445* (2013.01); *G06N 3/0454* (2013.01); *G06N 3/08* (2013.01); *G06T 7/73* (2017.01); *G06T 2207/20081* (2013.01); *G06T 2207/20084* (2013.01)

(58) Field of Classification Search
CPC . G01C 21/20; G06T 7/73; G06T 2207/20081; G06T 2207/20084; G06N 3/04; G06N 3/0445; G06N 3/0454; G06N 3/08
USPC .......................................................... 706/23
See application file for complete search history.

(56) References Cited

FOREIGN PATENT DOCUMENTS

| | | |
|---|---|---|
| CN | 106897538 | 6/2017 |
| DE | 202017106697 | 3/2018 |

OTHER PUBLICATIONS

Erdem et al, "A goal-directed spatial navigation model using forward trajectory planning based on grid cells," European Journal of Neuroscience, 2012, pp. 35:916-931 (Year: 2012).*

(Continued)

*Primary Examiner* — Shane D Woolwine
(74) *Attorney, Agent, or Firm* — Fish & Richardson P.C.

(57) ABSTRACT

Methods, systems, and apparatus, including computer programs encoded on a computer storage medium, for selecting actions to be performed by an agent interacting with an environment. In one aspect, a system comprises a grid cell neural network and an action selection neural network. The grid cell network is configured to: receive an input comprising data characterizing a velocity of the agent; process the input to generate a grid cell representation; and process the grid cell representation to generate an estimate of a position of the agent in the environment; the action selection neural network is configured to: receive an input comprising a grid cell representation and an observation characterizing a state of the environment; and process the input to generate an action selection network output.

20 Claims, 6 Drawing Sheets

(56) References Cited

OTHER PUBLICATIONS

Srivastava et al, "Dropout: a simple way to prevent neural networks from overfitting", Journal of Machine Learning Research, 2014, pp. 15:1929-1958 (Year: 2014).*
Zaremba W, Sutskever I, Vinyals O. "Recurrent neural network regularization". Sep. 8, 2014. arXiv preprint arXiv:1409.2329. (Year: 2014).*
Erdem UM, Milford MJ, Hasselmo ME. "A hierarchical model of goal directed navigation selects trajectories in a visual environment." Jan. 1, 2015. Neurobiology of learning and memory. ;117:109-21. (Year: 2015).*
Mirowski et al, "Learning to navigate in complex environments," International Conference on Learning Representations, 2017, 16 pages (Year: 2017).*
Ren Y, Zhao P, Sheng Y, Yao D, Xu Z. "Robust softmax regression for multi-class classification with self-paced learning." Aug. 19, 2017, In Proceedings of the 26th International Joint Conference on Artificial Intelligence(pp. 2641-2647). AAAI Press. (Year: 2017).*
Zhang J, Tai L, Boedecker J, Burgard W, Liu M. "Neural slam: Learning to explore with external memory." Jun. 29, 2017. arXiv preprint arXiv:1706.09520. (Year: 2017).*
Wang S, Clark R, Wen H, Trigoni N. "Deepvo: Towards end-to-end visual odometry with deep recurrent convolutional neural networks." May 29, 2017. In 2017 IEEE International Conference on Robotics and Automation (ICRA) (pp. 2043-2050). IEEE. (Year: 2017).*
Cueva CJ, Wei XX. "Emergence of grid-like representations by training recurrent neural networks to perform spatial localization". Mar. 21, 2018. arXiv preprint arXiv:1803.07770. (Year: 2018).*
Barry & Burgess, "Neural mechanisms of self-location," Current Biology, 2014, pp. 24:R330-R339.
Barry et al, "Experience-dependent rescaling of entorhinal grids," Nature neuroscience, 2007, pp. 10:682-684.
Bassett et al, "Neural correlates for angular head velocity in the rat dorsal tegmental nucleus," Journal of Neuroscience, 2001, pp. 21:5740-5751.
Bush et al, "Using grid cells for navigation," Neuron, 2015, pp. 87:507-520.
Chen et al, "How vision and movement combine in the hippocampal place code," Proceedings of the National Academy of Sciences, 2013, 110:378-383.
Dissanayake et al, "A solution to the simultaneous localization and map building (slam) problem," IEEE Transactions on Robotics and Automation, 2001, pp. 17:229-241.
Doeller et al, "Evidence for grid cells in a human memory network," Nature, 2010, pp. 463:657-661.
Erdem et al, "A goal-directed spatial navigation model using forward trajectory planning based on grid cells," European Journal of Neuroscience, 2012, pp. 35:916-931.
Fiete et al, "What grid cells convey about rat location," Journal of Neuroscience, 2008, pp. 28:6858-6871.
Hafting et al, "Microstructure of a spatial map in the entorhinal cortex," Nature, 2005, pp. 436:801-806.
Hardcastle et al, "Environmental boundaries as an error correction mechanism for grid cells," Neuron, 2015, pp. 86:827-839.
Kanitscheider, I. & Fiete, I. Training recurrent networks to generate hypotheses about how the brain solves hard navigation problems. arXiv preprint arXiv:1609.09059 (2016).
Kropff et al, "Speed cells in the medial entorhinal cortex," Nature, 2015, pp. 523:419-424.
Kulkarni et al, "Deep successor reinforcement learning," CoRR, 2016, 10 pages.
Langston et al, "Development of the spatial representation system in the rat," Science, 2010, 328:1576-1580.
LeCun et al, "Deep learning," Nature, 2015, pp. 521:436-444.
Mathis et al, "Optimal population codes for space: grid cells outperform place cells," Neural Computation, 2012, pp. 24:2280-2317.
McNaughton et al, "Path integration and the neural basis of the 'cognitive map'," Nature Reviews Neuroscience, 2006, pp. 7:663-678.
Milford & Wyeth, "Mapping a suburb with a single camera using a biologically inspired slam system," IEEE Transactions on Robotics, pp. 24:1038-1053.
Mirowski et al, "Learning to navigate in complex environments," International Conference on Learning Representations, 2017, 16 pages.
Mittelstaedt & Mittelstaedt, "Homing by path integration in a mammal," Naturwissenschaften, 1980, pp. 67:566-567.
Oh et al, "Control of memory, active perception, and action in minecraft," Proc. of International Conference on Machine Learning, 2016, ICML, 22 pages.
Sarel et al, "Vectorial representation of spatial goals in the hippocampus of bats," Science, 2017, pp. 355:176-180.
Sargolini et al, "Conjunctive representation of position, direction, and velocity in entorhinal cortex," 2006, Science, pp. 312:758-762.
Silver et al, "Mastering the game of go with deep neural networks and tree search," Nature, 2016, pp. 529:484-489.
Srivastava et al, "Dropout: a simple way to prevent neural networks from overfilling," Journal of Machine Learning Research, 2014, pp. 15:1929-1958.
Stemmler et al, "Connecting multiple spatial scales to decode the population activity of grid cells," Science advances, 2015, 12 pages.
Stensola et al, "The entorhinal grid map is discretized," Nature, 2012, pp. 492:72-78.
Wills et al, "Development of the hippocampal cognitive map in preweanling rats," Science, 2010, pp. 328:1573-1576.
Zhang et al, "Optogenetic dissection of entorhinal-hippocampal functional connectivity," Science, 2013, 16 pages.
Andrea et al, "Vector-based navigation using grid-like represenations in artificial agents," Nature, May 9, 2018, 18 pages.
Edvardsen et al, "A passive mechanism for goal-directed navigation using grid cells," The European Conference on Artificial Life, Jul. 2015, 8 pages.
Gustafson et al, "Grid cells, Place cells, and Geodesic generalization for spatial reinforcement learning," Plos Computational Biology, Oct. 27, 2011, 15 pages.
PCT International Search Report and Written Opinion in International Appln No. PCT/EP2019/061890, dated Jul. 31, 2019, 22 pages.
Stachenfeld et al, "Deisgn principles of the hippocampal cognitive map," Advances in Neural Information Processing Systems, Jan. 2014, 9 pages.

* cited by examiner

TRAINING  TESTING

USING GRID CODES

TRAINING  TESTING

USING POSITION DATA

PERFORMING NAVIGATION TASKS USING GRID CODES

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes an action selection system implemented as computer programs on one or more computers in one or more locations that can control an agent by selecting actions to be performed by the agent that cause the agent to solve tasks that involve navigating through an environment.

According to a first aspect there is provided a system for selecting actions to be performed by an agent interacting with an environment. The system comprises one or more computers and one or more storage devices storing instructions that when executed by the one or more computers cause the one or more computers to implement a grid cell neural network. The grid cell neural network may be configured to receive an input comprising data characterizing a velocity of the agent; process the input to generate a grid cell representation; and process the grid cell representation to generate an estimate of a position of the agent in the environment. The one or more computers may also implement an action selection neural network. The action selection neural network may be configured to receive an input comprising a grid cell representation and an observation characterizing a state of the environment; and process the input to generate an action selection network output. The one or more computers may also implement a subsystem that is configured to receive data characterizing a current velocity of the agent; provide the data characterizing the current velocity of the agent as input to the grid cell neural network to obtain a current grid cell representation; receive a current observation characterizing a current state of the environment; provide the current grid cell representation and the current observation as input to the action selection neural network to obtain an action selection network output; and select, using the action selection network output, an action to be performed by the agent in response to the current observation.

Some advantages of such a system are described later. For example where the actions are for navigating in the e.g. two dimensional environment, e.g. towards a goal, such navigation may be faster and more efficient, and able to adapt to an unfamiliar or changing environment. The agent may thus be a mechanical agent such as a robot or vehicle navigating in the environment and the actions may control movement of the agent.

In some implementations the action space may be discrete but may afford fine-grained motor control e.g. actions may control rotation, movement e.g. forward/backward/sideways, or effect rotational acceleration while moving.

In some implementations the action selection network output comprises a score distribution over actions in a set of possible actions. Selecting an action to be performed by the agent may then comprise sampling an action in the set of possible actions in accordance with the score distribution over the actions in the set of possible actions. The action selection neural network may comprise a recurrent neural network.

In some implementations the grid cell neural network comprises a recurrent neural network. Processing the input to generate the grid cell representation may comprise processing the input by a recurrent neural network layer to generate a recurrent layer output, and processing the recurrent layer output by a linear neural network layer to generate the grid cell representation.

In some implementations the linear neural network layer includes neurons having a spatial activity profile with hexagonal spatial periodicity and the grid cell representation may therefore have similar periodicity. In some implementations the spatial scale of the hexagonal spatial periodicity has a multimodal distribution with scale clusters and a defined ratio between (neighboring) clusters of e.g. around 1.5. That is, there may be hexagonal spatial periodicity at different scales with a fixed ratio between successive length scales. In some implementations the linear neural network layer may include neurons having a spatial activity profile defining a border location (of the environment) and/or place (specific location) and/or heading direction of the agent. Thus, the grid cell representation may similarly have e.g. hexagonal spatial periodicity at different, e.g. fixed ratio scales and may also indicate one or both of: the location of a border, and one or more specific locations in the environment. Theoretically, decomposing spatial location into a multiscale periodic code could allow the relative position of two points to be determined from the difference in code at each level of scale, combining the modulus remainder to determine a relative position vector.

In some implementations a grid cell neural network may be configured to process the grid cell representation to generate an estimate of a position of the agent in the environment by generating a linear transformation of the grid cell representation, and processing the linear transformation of the grid cell representation by a softmax layer to generate the estimate of the position of the agent in the environment. The estimate of the position of the agent in the environment may comprise a location of the agent and/or a head direction of the agent. Thus in implementations generating the linear transformation and processing this with a softmax layer may be performed for each of the location and the head direction.

In some implementations the grid cell neural network is trained by a supervised learning technique. During training regularization, e.g. dropout, may be applied to the linear neural network layer.

The data characterizing the velocity of the agent may comprise data characterizing a translational velocity of the agent and/or data characterizing an angular velocity of the agent. The system may implement a vision neural network configured to receive an input comprising an observation characterizing a state of the environment, and process the input to generate an estimate of the position of the agent in the environment. Then the grid cell neural network may receive a further input comprising an estimate of the position of the agent in the environment.

In some implementations the subsystem may, with a first probability, provide an estimate of the position of the agent in the environment generated by the vision neural network as input to the grid cell neural network. The vision neural network may comprise a convolutional neural network; it may be trained by a supervised learning technique. The subsystem may, with a second probability, process an estimate of the position of the agent in the environment generated by the vision neural network by a masking layer which zeros the estimate of the position of the agent in the environment to generate a masked estimate of the position of the agent, and provide the masked estimate of the position of the agent as input to the grid cell neural network. Each probability may be unity or less than unity. In this way the system may mimic the provision of imperfect observations of environmental clues.

In some implementations the action selection network is trained by a reinforcement learning technique to perform a navigation task in the environment. In implementations the action selection network output may further comprise a predicted expected return that is an estimate of a time-discounted return resulting from the environment being in the current state, and the reinforcement learning technique may be an actor-critic reinforcement learning technique.

The current observation characterizing the current state of the environment, provided as input to the action selection neural network, may comprise an image. In implementations the input received by the action selection neural network may further comprises a goal grid cell representation, i.e. a grid cell representation generated by the grid cell neural network at a (previous) time step when the position of the agent in the environment was a goal position. The subsystem may be further configured to maintain data specifying a goal grid cell representation and to provide the goal grid cell representation as input to the action selection neural network.

Particular embodiments of the subject matter described in this specification can be implemented so as to realize one or more of the following advantages.

The action selection system described in this specification can select actions to solve navigation tasks by processing "grid codes" that implicitly characterize the position of an agent in an environment. A grid code refers to an intermediate output generated by a grid cell neural network that is trained to integrate data defining the velocity of the agent over time to estimate the current position of the agent, i.e., to perform "dead reckoning".

The action selection system described in this specification can solve navigation tasks (e.g., tasks that involve navigating to specified "goal" locations in complex, unfamiliar, and changeable environments) more efficiently (e.g., quickly) than some action selection systems that do not process grid codes. For example, processing grid codes can enable the action selection system to perform "vector-navigation" by selecting actions that cause the agent to navigate to a goal location using direct (or approximately direct) routes that may cover areas of the environment that were not previously visited by the agent. In particular, processing grid codes can enable the action selection system described in this specification to select actions that cause the agent to take shortcuts that result in the agent reaching goal locations more efficiently than some other systems.

The action selection system described in this specification may be trained to reach an acceptable level of performance (i.e., in solving tasks) over fewer training iterations than some other systems. Therefore, training the action selection system described in this specification may consume fewer computational resources (e.g., memory and computing power) than training some other systems.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes an action selection system that can be used to control an agent by repeatedly selecting actions to be performed by the agent and causing the agent to perform the selected actions. An agent controlled by the action selection system can effectively perform tasks that involve navigating through an environment. The action selection system includes a grid cell neural network and an action selection neural network.

The grid cell network is configured to continually process data defining the current velocity of the agent to generate estimates of the current position of the agent in the environment. In generating an estimate for the current position of the agent, the grid cell network generates an intermediate output, referred to in this specification as a "grid code" or "grid cell representation", which implicitly characterizes the position of the agent in the environment.

The action selection network is configured to process the grid codes generated by the grid cell network and observations that characterize the current state of the environment to generate action selection outputs that can be used to select the actions to be performed by the agent.

These features and other features are described in more detail below.

Figure 1:
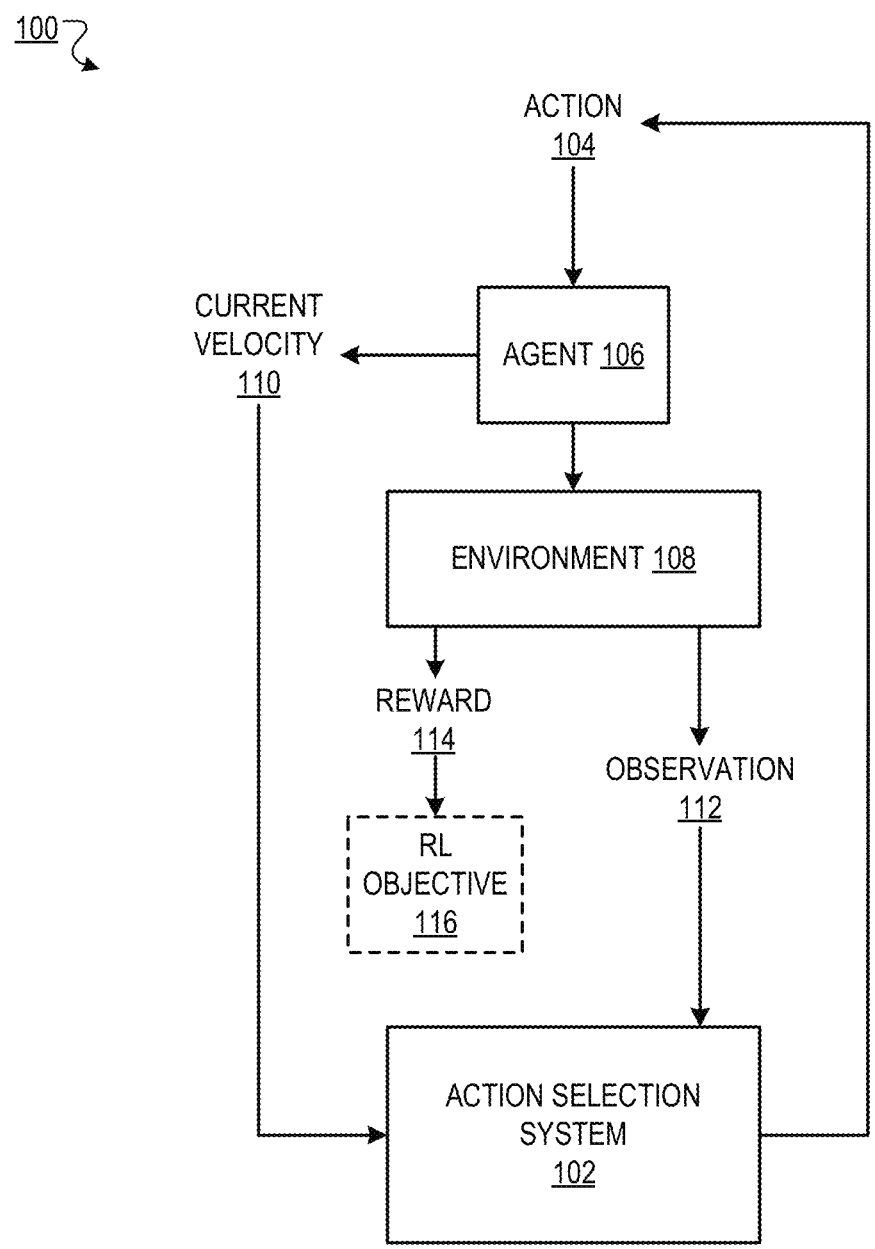
FIG. 1 illustrates an example data flow for using an action selection system to select actions that enable an agent to perform tasks that involve navigating through an environment.

FIG. 1 illustrates an example data flow 100 for using an action selection system 102 to select actions 104 that enable an agent 106 to perform tasks that involve navigating through an environment 108. The task performed by the agent 106 may be, e.g., locating an object in the environment 108, navigating through the environment to reach a specified destination (referred to as a "goal location"), or exploring the environment (e.g., navigating to as many locations in the environment as possible).

In some implementations, the environment 108 is a real-world environment and the agent 106 is a mechanical agent navigating through the real-world environment. For example, the agent may be a robot or an autonomous or semi-autonomous land, sea, or air vehicle. In other implementations, the environment 108 is a simulated environment and the agent 106 is implemented as one or more computer programs interacting with the simulated environment.

At each of multiple time steps, the action selection system 102 processes data characterizing: (i) the current velocity 110 of the agent 106, and (ii) the current state of the environment, to determine the action 104 to be performed by the agent at the time step. Data characterizing the current state of the environment is referred to in this specification as an "observation" 112.

The data characterizing the current velocity 110 of the agent may include data defining the current translational and angular velocities of the agent. The translational velocity of the agent can be represented as a two-dimensional (2D) vector [u, v], e.g., expressed in meters per second. The angular velocity of the agent characterizes the rate at which the "head direction" of the agent is changing, i.e., the rate at which the agent rotates about a vertical axis. The angular velocity of the agent can be represented as a scalar value, e.g., expressed in radians per second.

The observations 112 may be generated by or derived from sensors of the agent 106. For example, the observations 112 may be color images captured by a camera sensor of the agent 106, hyperspectral images captured by a hyperspectral sensor of the agent, or geometric data (e.g., a 3D point cloud) captured by a laser sensor of the agent (e.g., a Lidar sensor). The observations 112 may include textual or spoken instructions provided to the agent by a third-party (e.g., an operator of the agent). For example, the agent may be an autonomous vehicle, and a user of the autonomous vehicle may provide textual or spoken instructions to the agent (e.g., to navigate to a particular location).

The actions 104 performed by the agent 106 can control the movement of the agent 106 in the environment 108, e.g., by changing the translational velocity of the agent, the angular velocity of the agent 106, or both. The actions 104 may be represented, e.g., as torques that should be applied to the joints of the agent.

At each time step, the action selection system 102 may receive a reward 114 based on the current state of the environment 108 and the action 104 of the agent 106 at the time step. In general, the reward 114 is a numerical value. The reward 114 may indicate whether the agent 106 has accomplished a task, or the progress of the agent 106 towards accomplishing a task. For example, if the task specifies that the agent should navigate through the environment to a goal location, then the reward at each time step may have a positive value once the agent reaches the goal location, and a zero value otherwise. As another example, if the task specifies that the agent should explore the environment, then the reward at a time step may have a positive value if the agent navigates to a previously unexplored location at the time step, and a zero value otherwise.

Reinforcement learning techniques are used to train the action selection system 102 to select actions that increase a cumulative measure of rewards received by the action selection system 102. More specifically, the action selection system 102 is trained by iteratively adjusting the values of some or all of the parameters of the action selection system 102 using gradients of a reinforcement learning objective function 116. Training the action selection system 102 will be described in more detail below.

Figure 2:
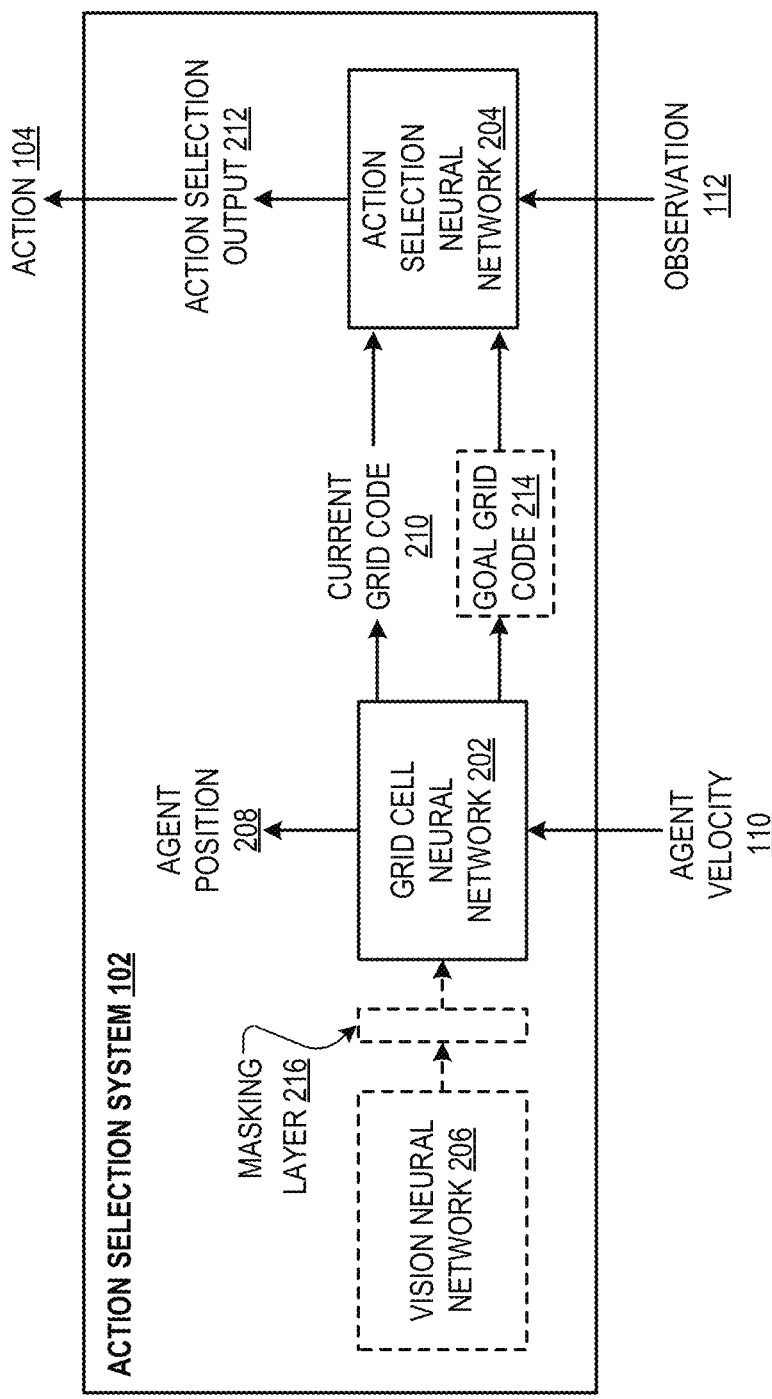
FIG. 2 shows an example action selection system.

FIG. 2 shows an example action selection system 102. The action selection system 102 is an example of a system implemented as computer programs on one or more computers in one or more locations in which the systems, components, and techniques described below are implemented.

At each of multiple time steps, the action selection system 102 processes data characterizing the current velocity 110 of the agent and an observation 112 characterizing the current state of the environment to select an action 104 to be performed by the agent at the time step.

The action selection system 102 includes a grid cell network 202, an action selection network 204, and optionally, a vision network 206.

The grid cell network 202 is configured to process the velocity data 110 to generate an output that characterizes an estimated position 208 of the agent in the environment.

The velocity data 110 may include data defining, e.g., the current translational and angular velocities of the agent, as described earlier.

The position data 208 generated by the grid cell network 202 may include: (i) location data that characterizes the spatial location of the agent in the environment, and (ii) head direction data that characterizes the orientation of the agent (i.e., about a vertical axis). The format of the position data 208 and an example architecture of the grid cell network 202 are described in more detail with reference to FIG. 3.

As part of generating the position data 208, the grid cell network 202 generates the current grid code 210 as an intermediate output. An intermediate output of a neural network refers to an output generated by one or more neurons from one or more intermediate layers of the neural network (i.e., layers that are not input or output layers).

The grid code 210 can be represented as an ordered collection of numerical values, e.g., a vector or matrix of numerical values, and implicitly characterizes the position of the agent in the environment.

The action selection network 204 is configured to process an input that includes: (i) the current grid code 210, and (ii) the current observation 112, to generate an action selection output 212. The system 102 uses the action selection output 212 generated by the action selection network 204 to select the action 104 to be performed by the agent at the current time step. A few examples follow.

In one example, the action selection output 212 may include a respective numerical probability value for each action in a set of possible actions that can be performed by the agent. The system 102 can select the action to be performed by the agent, e.g., by sampling an action in accordance with the probability values for the actions, or by selecting the action with the highest probability value.

In another example, the action selection output 212 may directly define the action to be performed by the agent, e.g., by defining the values of torques that should be applied to the joints of a robotic agent.

In another example, the action selection output 212 may include a respective Q-value for each action in the set of possible actions that can be performed by the agent. The system 102 can process the Q-values (e.g., using a soft-max function) to generate a respective probability value for each possible action, which can be used to select the action to be performed by the agent (as described earlier). The system 102 could also select the action with the highest Q-value as the action to be performed by the agent.

The Q-value for an action is an estimate of a return that would result from the agent performing the action in response to the current observation 112 and thereafter selecting future actions performed by the agent 106 in accordance with the current values of the action selection network parameters. A return refers to a cumulative measure of reward received by the agent, for example, a time-discounted sum of rewards.

In some cases, the system 102 can select the action to be performed by the agent in accordance with an exploration policy. For example, the exploration policy may be an $\epsilon$-greedy exploration policy, where the system 102 selects the action to be performed by the agent in accordance with the action selection output 212 with probability 1−$\epsilon$, and selects the action to be performed by the agent randomly with probability $\epsilon$. In this example, $\epsilon$ is a scalar value between 0 and 1.

In some cases, the system 102 may be used to select actions that enable the agent to perform a navigation task that involves repeatedly returning to a specified "goal" position in the environment, e.g., from different starting positions in the environment. To facilitate the selection of actions that enable the agent to return to the goal position in the environment, the action selection network 204 may be configured to process a "goal" grid code 214 in addition to the current grid code 210. The goal grid code 214 refers to a grid code that was generated by the grid cell network 202 when the agent was in the goal position.

At time steps before the agent first navigates to the goal position in the environment, the system 102 can provide the action selection network 204 with a "default" grid code (e.g., a grid code with all zero values) in lieu of the goal grid code 214. At the first time step that the agent navigates to the goal position, the system 102 can store the corresponding goal grid code 214 generated by the grid cell network 202. At each subsequent time step, the system 102 can provide the stored goal grid code 214 as an input to the action selection network.

In one example, the agent may be a robotic agent that is configured to perform navigation tasks in a real-world environment, e.g., parcel deliveries from a warehouse. The agent may initially explore the environment by navigating through the environment with the aim of visiting as many locations in the environment as possible. At each of multiple locations visited by the agent, the system 102 may store the grid code corresponding to the location. After the agent has explored the environment, the agent may be tasked with navigating to specific goal positions in the environment (e.g., representing a parcel warehouse or locations where parcels should be delivered). To navigate to a goal position in the environment, the agent may provide a goal grid code corresponding to the goal position in the environment (e.g., which was previously stored by the agent during exploration) to the action selection network. Thereafter, the agent may perform navigation actions specified by the output of the action selection network that cause the agent to navigate to the goal position (e.g., to perform a parcel delivery).

The action selection network 204 may process a variety of inputs in addition to the observation 112, the current grid code 210, and the goal grid code 214. For example, the action selection network 204 may additionally process the reward received at the previous time step, and a representation of the action performed by the agent at the previous time step. The action performed by the agent at the previous time step can be represented in any of a variety of ways, e.g., as a one-hot vector.

The action selection network 204 can have any of a variety of neural network architectures. For example, the action selection network 204 can include one or more convolutional neural network layers and a recurrent neural network layer (e.g., a long short-term memory (LSTM) layer). The convolutional layers may be configured to process the observation to generate an encoded representation of the observation (e.g., as an ordered collection of numerical values, e.g., a vector or matrix of numerical values). The recurrent layer may be configured to process the encoded representation of the observation, the current grid code, the goal grid code, the action performed at the previous time step, and the reward received at the previous time step, to generate the action selection output 212.

Figure 4:
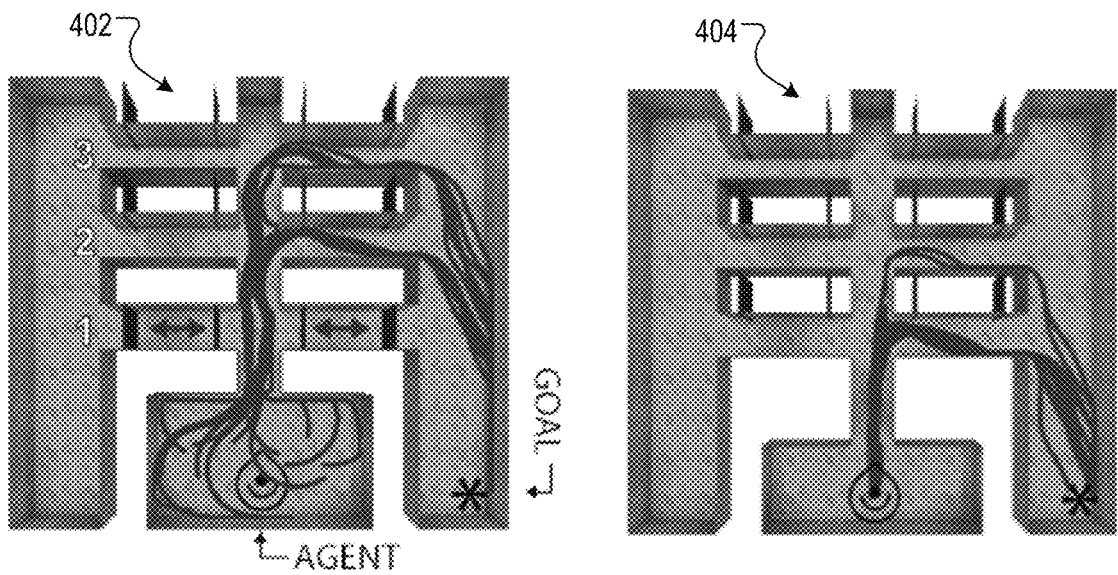
FIG. 4 provides a qualitative illustration of one example of the performance gains that can be achieved in navigation tasks by providing grid codes to the action selection network rather than position data.
Figure 4:
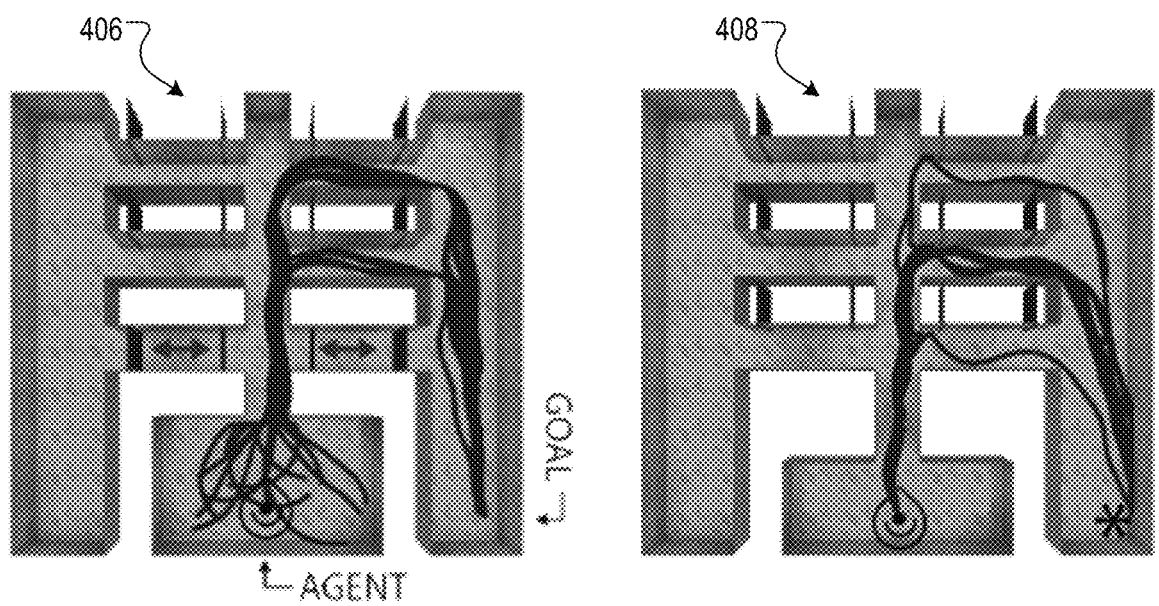
Figure 5:
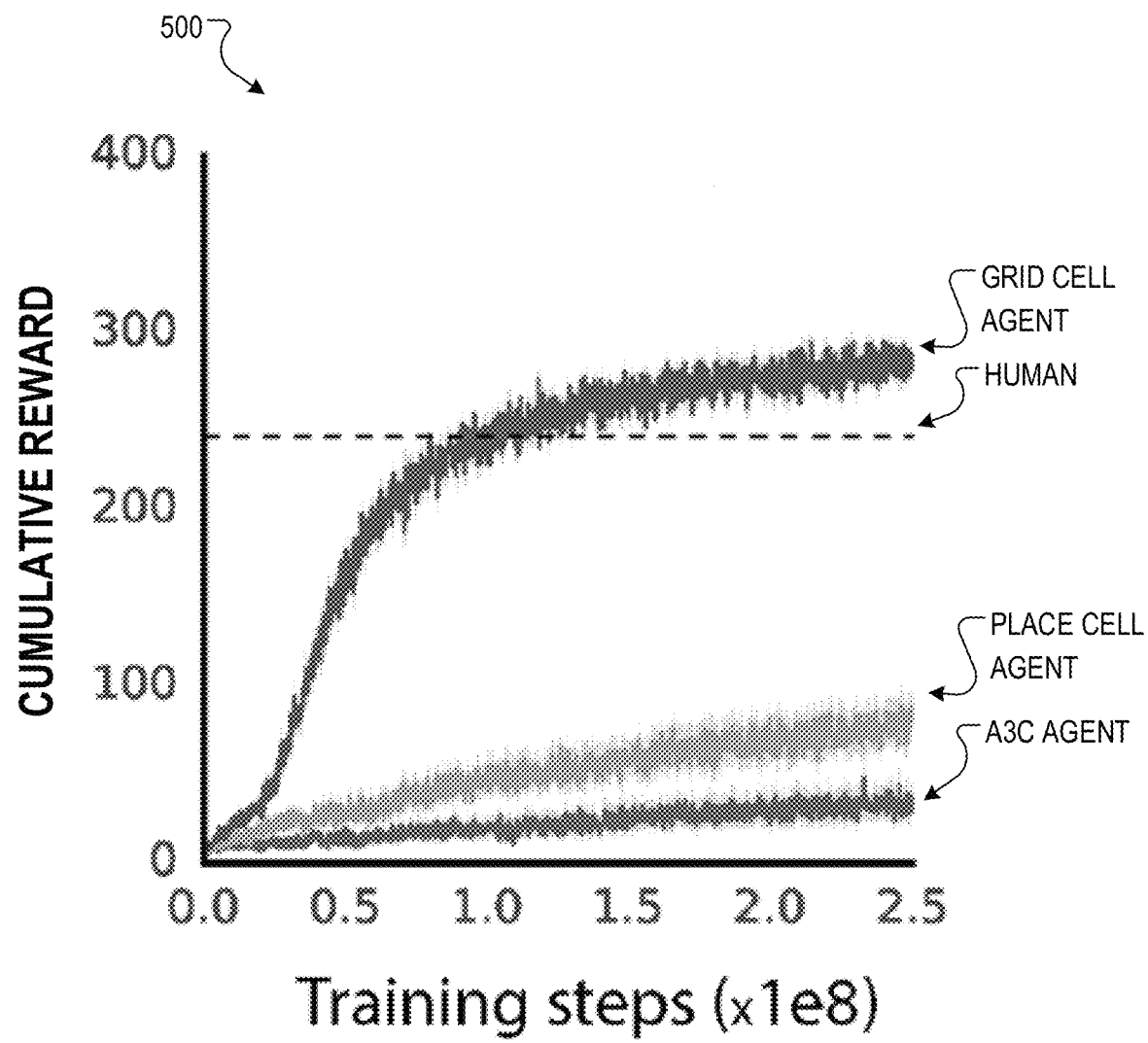
FIG. 5 provides a quantitative illustration of one example of the performance gains that can be achieved in navigation tasks by providing grid codes to the action selection network rather than position data.

Processing the grid codes generated by the grid cell network 202 enables the action selection network 204 to select actions that efficiently solve navigation tasks. In particular, processing grid codes can enable the action selection network 204 to select actions that cause the agent to navigate to a goal location using direct (or approximately direct) routes that may cover areas of the environment that were not previously visited by the agent. In contrast, the action selection network 204 may select actions that solve navigation tasks less efficiently (or not at all) if it is configured to process other sorts of data characterizing the position of the agent in the environment, e.g., the position data 208. FIG. 4 and FIG. 5 illustrate examples of the performance gains that can be achieved in navigation tasks by providing grid codes to the action selection network rather than, e.g., position data 208.

The vision network 206, when it is included in the system 102, is configured to process the observation 112 to generate an estimate of the position of the agent in the environment. In one example, the observation 112 may include an image of the environment, and the vision network 206 may be configured to generate an estimate of the position of the agent based on the visual appearance of the environment (i.e., as represented by the image). Similar to the grid cell network 202, the vision network 206 may generate an estimate of the position of the agent that includes: (i) location data that characterizes the spatial location of the agent, and (ii) head direction data that characterizes the orientation of the agent. Examples of location data and head direction data that can be generated by the vision network 206 and the grid cell network 202 are described in more detail with reference to FIG. 3.

The system 102 can provide the output of the vision network 206 as an additional input to the grid cell network 202 at each time step. In some cases, at each time step, the system 102 may sample a Bernoulli random variable before providing the output of the vision network 206 to the grid cell network 202. If the random variable assumes a specified value (e.g., 0), then the system 102 may process the output of the vision network using a "masking" neural network layer 216 that zeros the output of the vision network 206 before it is provided to the grid cell network 202. Using the masking layer to zero the output of the vision network 206 at certain time steps (e.g., with some probability) can regularize the training of the system. For example, using the masking layer may cause the system to generate grid codes mainly based on integrating the velocity signal (which is independent of the environment) rather than relying on visual cues (which are environment dependent). Relying on visual cues in an environment may cause the system to overfit the environment during training, and therefore reduce the performance of the system in performing tasks (e.g., navigation tasks) in other environments.

The vision network 206 can have any of a variety of neural network architectures. For example, the vision network 206 may have an architecture that includes one or more convolutional neural network layers, followed by two output layers that each process the output of the final convolutional layer. In this example, one of the output layers may generate the location data, and the other output layer may generate the head direction data.

The system 102 can train the action selection network 204, the grid cell network 202, and the vision network 206 to determine trained values of their respective parameters.

The system 102 can train the action selection network 204 using reinforcement learning training techniques. More specifically, the system 102 can iteratively adjust the values of the action selection network parameters using gradients of a reinforcement learning objective function with respect to the action selection system parameters to increase a cumulative measure of reward received by the system 102. The system 102 can train the action selection network 204 using any appropriate reinforcement learning technique, for example, a Q-learning technique or an actor-critic technique.

In one implementation, the system 102 trains the action selection network 204 using an actor-critic technique. In this implementation, the action selection network 204 is configured to generate a value estimate in addition to the action selection output 212. The value estimate represents an estimate of a return that would result from selecting future actions performed by the agent in accordance with the current values of the action selection network parameters. The system 102 may train the action selection network using gradients of a reinforcement learning objective function $\mathcal{L}_{RL}$ given by:

$$\mathcal{L}_{RL} = \mathcal{L}_\pi + \alpha \mathcal{L}_V + \beta \mathcal{L}_H \tag{1}$$

$$\mathcal{L}_\pi = -\mathbb{E}_{s_t \sim \pi}[\hat{R}_t] \tag{2}$$

$$\mathcal{L}_V = \mathbb{E}_{s_t \sim \pi}[(\hat{R}_t - V(s_t, \theta))^2] \tag{3}$$

$$\mathcal{L}_H = -\mathbb{E}_{s_t \sim \pi}[H(\pi(\cdot|s_t, \theta))] \tag{4}$$

where $\alpha$ and $\beta$ are positive constant values, $\mathbb{E}_{s_t \sim \pi}[\cdot]$ refers to the expected value with respect to the current action selection policy (i.e., defined by the current values of the action selection network parameters $\theta$), $V(s_t, \theta)$ refers to the value estimate generated by the action selection network for observation $s_t$, $H(\pi(\cdot|s_t, \theta))$ is a regularization term that refers to the entropy of the probability distribution over possible actions generated by the action selection network for observation $s_t$, and $\hat{R}_t$ refers to the n-step look-ahead return, e.g., given by:

$$\hat{R}_t = \sum_{i=1}^{n-1} \gamma^i r_{t+i} + \gamma^n V(s_{t+n}, \theta) \tag{5}$$

where $\gamma$ is a discount factor between 0 and 1, $r_{t+i}$ is the reward received at time step t+i, and $V(s_{t+n}, \theta)$ refers to the value estimate at time step t+n.

The system 102 can train the grid cell network 202 and the vision network 206 using supervised learning techniques, as will be described in more detail below.

Figure 3:
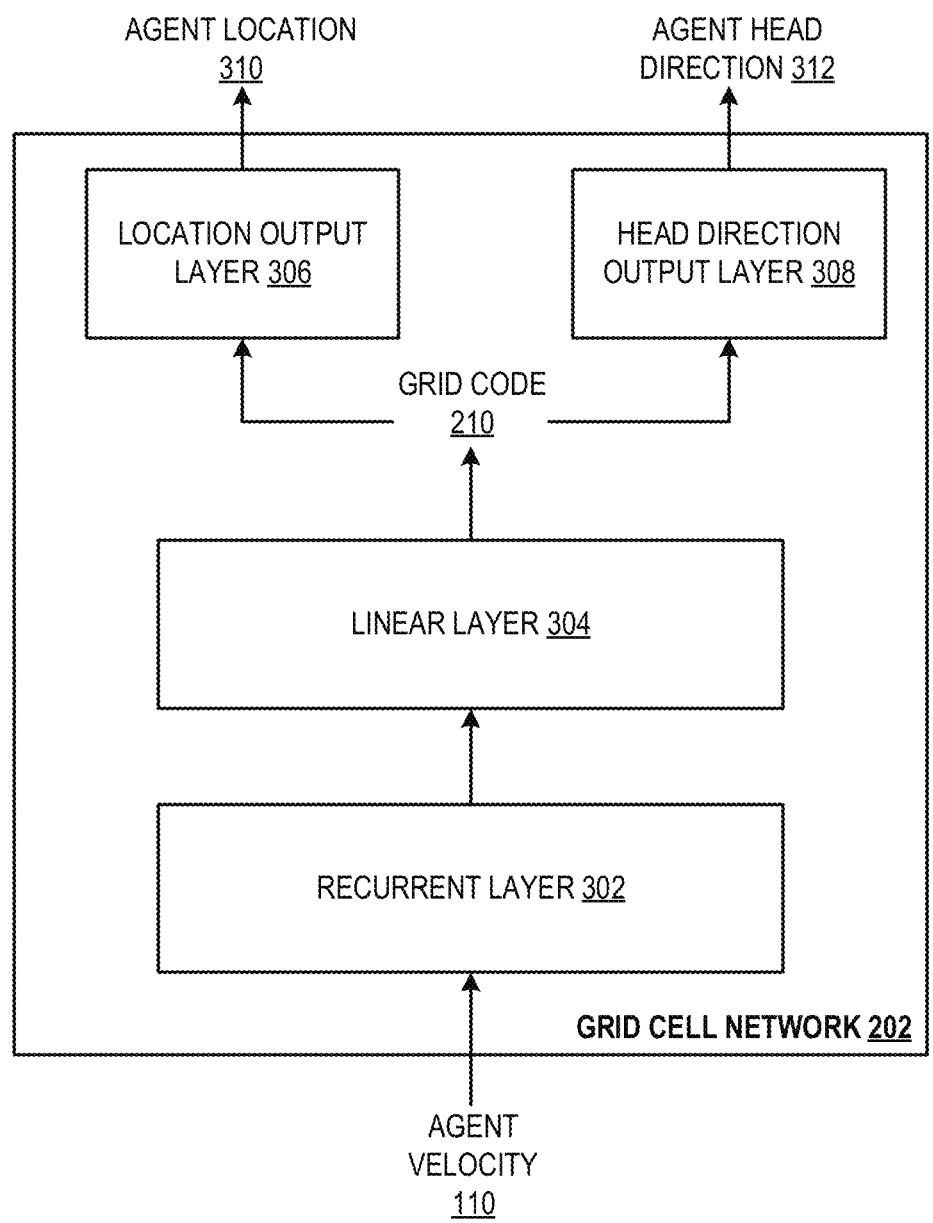
FIG. 3 illustrates an example architecture of the grid cell network.

FIG. 3 illustrates an example architecture of the grid cell network 202. At each time step, the grid cell network 202 is configured to process an input that includes data defining the current velocity 110 of the agent (and optionally, the output of the vision network) to generate data estimating the current position of the agent in the environment. For example in some implementations the input at each time step may comprise an e.g. egocentric linear velocity and the agent's angular velocity e.g. a sine and cosine of its angular velocity.

In the example depicted in FIG. 3, the grid cell network 202 includes a recurrent layer 302, a linear layer 304, a location output layer 306, and a head direction output layer 308.

The recurrent layer 302 is configured to process the grid cell network input to update a hidden state of the recurrent layer (based at least in part on the value of the hidden state at the previous time step) and to generate a recurrent layer output. The recurrent layer 302 may be, e.g., a long short-term memory (LSTM) layer.

The linear layer is configured to apply a linear transformation (e.g., defined by a weight matrix and a bias vector) to the recurrent layer output to generate the grid code 210. In a particular example, the grid code 210 may be represented as a vector with 512 components.

The location output layer 306 processes the grid code 210 to generate location data 310 characterizing the estimated spatial location of the agent in the environment. The location data 310 can be represented in any of a variety of ways. A few examples follow.

In one example, the location data 310 may characterize the estimated proximity of the spatial location of the agent to each of multiple "reference" spatial locations. For example, the grid cell network 202 may be trained to generate location data 310 that matches an N-dimensional vector $[c_i]_{i=1}^N$ given by:

$$c_i = \frac{\exp\left(-\frac{|x - \mu_i|_2^2}{2\sigma^2}\right)}{\sum_{j=1}^{N} \exp\left(-\frac{|x - \mu_j|_2^2}{2\sigma^2}\right)} \tag{6}$$

where N is the number of reference spatial locations, x is a 2D vector representing the current spatial location of the agent (e.g., in x-y coordinates), $\mu_i$ is a 2D vector representing the i-th reference spatial location, and $\sigma^2$ is a predetermined variance parameter. The reference spatial locations may be selected randomly in an environment prior to the training of the grid cell network. In this example, the location output layer 306 may generate the location data 310 by applying a linear transformation (e.g., defined by a weight matrix and a bias vector) and a subsequent soft-max activation function to the grid code 210.

In another example, the location data 310 may directly estimate the spatial location of the agent in the environment, e.g., as a 2D vector. In this example, the location output layer 306 may generate the location data 310 by applying a linear transformation (e.g., defined by a weight matrix and a bias vector) to the grid code 210.

The head direction output layer 308 processes the grid code 210 to generate head direction data 312 characterizing the orientation of the agent, e.g., about a vertical axis. The head direction data 312 can be represented in any of a variety of ways. A few examples follow.

In one example, the head direction data 312 may characterize the proximity of the head direction of the agent to each of multiple "reference" head directions. For example, the grid cell network 202 may be trained to generate head direction data 312 that matches an M-dimensional vector $[h_i]_{i=1}^M$ given by:

$$h_i = \frac{\exp(\kappa\cos(\phi - \alpha_i))}{\sum_{j=1}^{m} \exp(\kappa\cos(\phi - \alpha_j))} \qquad (7)$$

where M is the number of reference head directions, φ is a scalar value representing the current head direction of the agent (e.g., in radians), $\alpha_i$ is a numerical value representing the i-th reference head direction (e.g., in radians), and κ is predetermined positive scalar value. The reference head directions may be selected randomly (e.g., in the range [−π, π]) prior to the training of the grid cell network. In this example, the head direction output layer 308 may generate the head direction data 312 by applying a linear transformation (e.g., defined by a weight matrix and a bias vector) and a subsequent soft-max activation function to the grid code 210. The weight matrix and bias vector may be learned or optimized during training.

In another example, the head direction data 312 may directly estimate the head direction of the agent, e.g., as a scalar value in the range [−π, π]. In this example, the head direction output layer 308 may generate the head direction data 312 by applying a linear transformation (e.g., defined by a weight matrix and a bias vector) to the grid code 210. The weight matrix and bias vector may be learned or optimized during training.

The action selection system 102 can train the grid cell network 202 using any appropriate supervised learning technique. More specifically, the action selection system 102 can adjust the values of the grid cell network parameters using gradients of a supervised learning objective function with respect to the grid cell network parameters. The supervised learning objective function measures a similarity between: (i) the location data 310 and head direction data 312 generated by the grid cell network 202, and (ii) "target" location data and head direction data that characterizes the actual position of the agent in the environment. In a simulated environment, the target location data and head direction data may be accessible as parameters of the simulated environment (e.g., through an application programming interface (API)) made available by the simulated environment. In a real-world environment, the target location data and head direction data may be generated by sensors of the agent, e.g., the target location data may be generated by a radio-navigation system of the agent. The supervised learning objective function may be, e.g., a cross-entropy objective function or a squared-error objective function.

In a particular example, the location output layer 306 may generate an N-dimensional vector $[y_i]_{i=1}^{N}$, the head direction output layer 308 may generate an M-dimensional vector $[z_j]_{j=1}^{M}$, and the supervised learning objective function $\mathcal{L}_S$ may be a cross-entropy objective function given by:

$$\mathcal{L}_S = -\sum_{i=1}^{N} c_i \log y_i - \sum_{j=1}^{M} h_j \log z_j \qquad (8)$$

where $[c_i]_{i=1}^{N}$ is given by equation (6) and characterizes the proximity of the spatial location of the agent to each of multiple reference spatial locations, and $[h_j]_{j=1}^{M}$ is given by equation (7) and characterizes the proximity of the head direction of the agent to each of multiple reference head directions.

In some cases, the action selection system 102 can use regularization techniques during the training of the grid cell network 202, e.g., the action selection system 102 can apply dropout to the linear layer 304 that generates the grid code 210 during training.

The action selection system 102 can train the vision network 206 to generate location data and head direction data using supervised learning techniques similar to those described above with reference to the grid cell network.

FIG. 4 provides a qualitative illustration of one example of the performance gains that can be achieved in navigation tasks by providing grid codes to the action selection network rather than position data. The navigation task described with reference to FIG. 4 requires an agent to repeatedly navigate to a goal location in an environment.

The illustration 402 depicts examples of paths followed by a "grid cell" agent being trained to navigate through the maze using an action selection network that is configured to process current and goal grid codes generated by a grid cell network, as described with reference to FIG. 2. In this example, corridor 1 (indicated by the white "1" in 402) is blocked during training, so the action selection network adapts to cause the grid cell agent to navigate through corridors 2 and 3 (respectively indicated by the white "2" and "3" in 402).

After training, corridor 1 in the maze is unblocked, i.e., so the agent can freely traverse it. The illustration 404 depicts examples of paths followed by the trained grid cell agent. It can be appreciated that the trained grid cell agent frequently navigates to the goal location using an efficient "short-cut" through corridor 1, despite never having traversed corridor 1 during training.

The illustration 406 depicts examples of paths followed by a "place cell" agent being trained to navigate through the maze using an action selection network that is configured to process position data, rather than grid codes. In particular, at each time step, the action selection network processes current position data that characterizes the current position of the agent in the environment, and once the agent has reached the goal position, goal position data that characterizes the position of the goal location in the environment. The position data is composed of the location data and head direction data described with reference to equations (6) and (7) respectively. As before, corridor 1 is blocked during training, and the action selection network adapts to cause the place cell agent to navigate through corridors 2 and 3.

As before, corridor 1 in the maze is unblocked after the place cell agent is trained. The illustration 408 depicts examples of paths followed by the trained place cell agent. It can be appreciated that the trained place cell agent frequently navigates to the goal location using corridors 2 and 3, despite being able to reach the goal location more efficiently using corridor 1.

FIG. 5 provides a quantitative illustration of one example of the performance gains that can be achieved in navigation tasks by providing grid codes to the action selection network rather than position data. The horizontal axis of the graph 500 represents the number of training steps that have been performed in training a grid cell agent, a place cell agent, and an "A3C" agent. The vertical axis represents the cumulative reward received by the respective agents and a human in performing a navigation task. The navigation task involves repeatedly navigating to a goal location in an environment.

As described above, the grid cell agent performs the navigation task using an action selection network that is configured to process current and goal grid codes generated by a grid cell network. The place cell agent performs the navigation task using an action selection network that is configured to process position data (e.g., location and head direction data), rather than grid codes. The A3C agent performs the navigation task using an action selection network that processes neither grid codes nor position data; rather, it processes the current observation, the reward received at the previous time step, and data defining the action performed at the previous time step.

It can be appreciated from the graph 500 that the grid cell agent achieves the best performance on the navigation task, even surpassing human performance.

Figure 6:
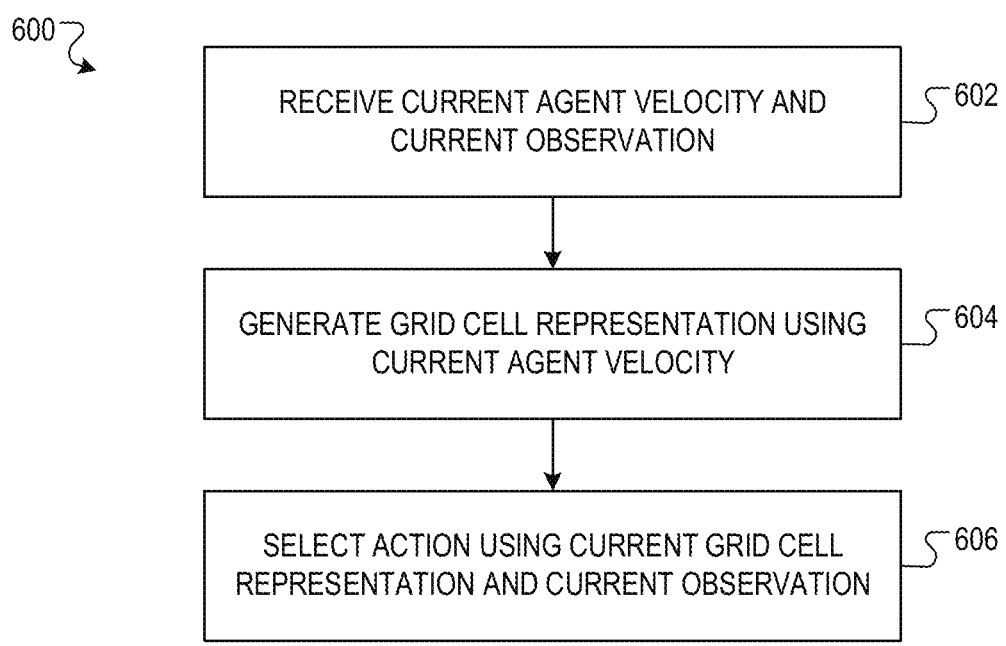
FIG. 6 is a flow diagram of an example process for selecting an action to be performed by an agent at a time step.

FIG. 6 is a flow diagram of an example process 600 for selecting an action to be performed by an agent at a time step. For convenience, the process 600 will be described as being performed by a system of one or more computers located in one or more locations. For example, an action selection system, e.g., the action selection system 102 of FIG. 2, appropriately programmed in accordance with this specification, can perform the process 600.

The system receives: (i) data characterizing the current velocity of the agent, and (ii) a current observation characterizing the current state of the environment (602). The data characterizing the velocity of the agent may include data characterizing the translational velocity of the agent and data characterizing the angular velocity of the agent. The current observation may be generated by or derived from sensors of the agent. For example, the current observation may include one or more of: a color image captured by a camera sensor of the agent, a hyperspectral image captured by a hyperspectral sensor of the agent, and geometric data captured by a laser sensor of the agent.

The system processes the data characterizing the current velocity of the agent using a grid cell neural network to obtain a current grid cell representation (i.e., a "grid code") (604). More specifically, the grid cell neural network generates the grid code as an intermediate output while processing the data characterizing the current velocity of the agent to generate an estimate of the position of the agent in the environment. The estimate of the position of the agent in the environment may include a spatial location of the agent in the environment and a head direction of the agent.

In some cases, particularly when the grid cell network is no longer being trained, the system may use the grid cell network to generate the grid code without generating the estimate of the position of the agent in the environment. For example, referring to the example grid cell network architecture described with reference to FIG. 3, the system may generate the grid code but refrain from providing the grid code to the location output layer or the head direction output layer.

Optionally, the system may provide the output of a vision neural network as an additional input to the grid cell network. The vision network is configured to process the current observation to generate an estimate of the position of the agent in the environment (e.g., the spatial location of the agent and the head direction of the agent). In some cases, the system directly provides the output of the vision network as an input to the grid cell network with some probability, and otherwise processes the output of the vision network using a masking layer before providing it to the grid cell network. The masking layer is configured to zero its input (i.e., to map any input to an output that consists of zeros) with a defined probability e.g. 95%.

The system selects the action to be performed by the agent at the current time step using the current grid code and the current observation (606). In particular, the system processes the current grid code and the current observation using an action selection network to generate an action selection output, and thereafter selects the action to be performed by the agent using the action selection output. In one example, the action selection output includes a score distribution over actions in a set of possible actions, i.e., defines a respective score for each action in the set of possible actions. In this example, the system may select the action to be performed by the agent by sampling an action in accordance with the score distribution over the actions in the set of possible actions.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system for selecting actions to be performed by an agent interacting with an environment to navigate to a goal position in the environment, the system comprising one or more computers and one or more storage devices storing instructions that when executed by the one or more computers cause the one or more computers to implement:
    a grid cell neural network that is configured to:
        receive an input comprising data characterizing a velocity of the agent;
        process the input to generate a grid cell representation, wherein the grid cell representation is generated as an output by a hidden layer of the grid cell neural network; and
        process the grid cell representation to generate an estimate of a position of the agent in the environment;
    an action selection neural network that is configured to:
        receive an input comprising: (i) a current grid cell representation generated by the grid cell neural network at a current time step, (ii) a goal grid cell representation that was generated by the grid cell neural network at a previous time step when the agent was located in the goal position in the environment, and (iii) a current observation characterizing a current state of the environment; and
        process the input to generate an action selection network output;
    a subsystem that is configured to:
        maintain data specifying the goal grid cell representation in a memory; and
        at each of a plurality of time steps:
            receive data characterizing a current velocity of the agent;
            provide the data characterizing the current velocity of the agent as input to the grid cell neural network to obtain a current grid cell representation;
            receive a current observation characterizing a current state of the environment;
            provide: (i) the current grid cell representation, (ii) the goal grid cell representation, and (iii) the current observation as input to the action selection neural network to obtain an action selection network output; and
            select, using the action selection network output, an action to be performed by the agent in response to the current observation.

2. The system of claim 1, wherein:
    the action selection network output comprises a score distribution over actions in a set of possible actions, and selecting an action to be performed by the agent comprises sampling an action in the set of possible actions in accordance with the score distribution over the actions in the set of possible actions.

3. The system of claim 1, wherein the grid cell neural network is a recurrent neural network.

4. The system of claim 1, wherein the action selection neural network is a recurrent neural network.

5. The system of claim 1, wherein the data characterizing the velocity of the agent comprises data characterizing a translational velocity of the agent and data characterizing an angular velocity of the agent.

6. The system of claim 1, wherein the estimate of the position of the agent in the environment comprises a location of the agent and a head direction of the agent.

7. The system of claim 1, wherein:
    the instructions further cause the one or more computers to implement a vision neural network that is configured to:
        receive an input comprising an observation characterizing a state of the environment; and
        process the input to generate an estimate of the position of the agent in the environment; and
    wherein the grid cell neural network is configured to:
        receive an input further comprising an estimate of the position of the agent in the environment.

8. The system of claim 7, wherein the subsystem is further configured to provide an estimate of the position of the agent in the environment generated by the vision neural network as input to the grid cell neural network.

9. The system of claim 7, wherein the subsystem is further configured to:
    with a first probability, provide an estimate of the position of the agent in the environment generated by the vision neural network as input to the grid cell neural network;
    with a second probability, process an estimate of the position of the agent in the environment generated by the vision neural network by a masking layer which zeros the estimate of the position of the agent in the environment to generate a masked estimate of the position of the agent, and provide the masked estimate of the position of the agent as input to the grid cell neural network.

10. The system of claim 7, wherein the vision neural network is a convolutional neural network.

11. The system of claim 1, wherein processing the input to generate a grid cell representation comprises:
    processing the input by a recurrent neural network layer to generate a recurrent layer output; and
    processing the recurrent layer output by a linear neural network layer to generate the grid cell representation.

12. The system of claim 11, wherein dropout is applied to the linear neural network layer.

13. The system of claim 11, wherein processing the grid cell representation to generate an estimate of a position of the agent in the environment comprises:
    generating a linear transformation of the grid cell representation; and
    processing the linear transformation of the grid cell representation by a softmax layer to generate the estimate of the position of the agent in the environment.

14. The system of claim 1, wherein the action selection network is trained by a reinforcement learning technique to perform a navigation task in the environment.

15. The system of claim 14, wherein the action selection network output further comprises a predicted expected return that is an estimate of a time-discounted return resulting from the environment being in the current state, and wherein the reinforcement learning technique is an actor-critic reinforcement learning technique.

16. The system of claim 1, wherein the grid cell neural network is trained by a supervised learning technique.

17. The system of claim 7, wherein the vision neural network is trained by a supervised learning technique.

18. The system of claim 1, wherein the current observation characterizing the current state of the environment is an image.

19. One or more non-transitory computer storage media storing instructions that when executed by one or more computers cause the one or more computers to perform operations for selecting actions to be performed by an agent interacting with an environment to navigate to a goal position in the environment, the operations comprising, at each of a plurality of time steps:
  receiving data characterizing a current velocity of the agent;
  providing the data characterizing the current velocity of the agent as an input to a grid cell neural network to obtain a current grid cell representation, wherein the grid cell neural network is trained to:
    process an input characterizing a velocity of the agent to generate a grid cell representation, wherein the grid cell representation is generated as an output by a hidden layer of the grid cell neural network; and
    process the grid cell representation to generate an estimate of a position of the agent in the environment;
  receiving a current observation characterizing a current state of the environment;
  obtain, from a memory, a goal grid cell representation that was generated by the grid cell neural network at a previous time step when the agent was located in the goal position in the environment;
  processing: (i) the current grid cell representation, (ii) the goal grid cell representation, and (iii) the current observation using an action selection neural network to generate an action selection network output; and
  selecting, using the action selection network output, an action to be performed by the agent in response to the current observation.

20. A method, performed by one or more data processing apparatus, for selecting actions to be performed by an agent interacting with an environment to navigate to a goal position in the environment, the method comprising, at each of a plurality of time steps:
  receiving data characterizing a current velocity of the agent;
  providing the data characterizing the current velocity of the agent as an input to a grid cell neural network to obtain a current grid cell representation, wherein the grid cell neural network is trained to:
    process an input characterizing a velocity of the agent to generate a grid cell representation, wherein the grid cell representation is generated as an output by a hidden layer of the grid cell neural network; and
    process the grid cell representation to generate an estimate of a position of the agent in the environment;
  receiving a current observation characterizing a current state of the environment;
  obtain, from a memory, a goal grid cell representation that was generated by the grid cell neural network at a previous time step when the agent was located in the goal position in the environment;
  processing: (i) the current grid cell representation, (ii) the goal grid cell representation, and (iii) the current observation using an action selection neural network to generate an action selection network output; and
  selecting, using the action selection network output, an action to be performed by the agent in response to the current observation.

* * * * *